United States Patent
Park et al.

(10) Patent No.: US 7,079,518 B2
(45) Date of Patent: Jul. 18, 2006

(54) SYSTEM AND METHOD FOR PROVIDING MULTIMEDIA SERVICE USING A MOBILE COMMUNICATION TERMINAL

(75) Inventors: Young-Sik Park, Daegu-kwangyok-shi (KR); Hoe-Gun You, Kumi-shi (KR); Jeong-Dae Kim, Kumi-shi (KR); Kyung-Kyu Park, Kumi-shi (KR); Soon-Jin Kim, Kumi-shi (KR); Jeon-Man Park, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 849 days.

(21) Appl. No.: 09/838,895

(22) Filed: Apr. 20, 2001

(65) Prior Publication Data

US 2001/0048685 A1  Dec. 6, 2001

(30) Foreign Application Priority Data

Jun. 3, 2000 (KR) ............................... 2000-30612

(51) Int. Cl.
*H04Q 7/24* (2006.01)
(52) U.S. Cl. ...................................... 370/338; 370/356
(58) Field of Classification Search ............... 370/310,
370/310.2, 328, 338, 352–358, 386, 401,
370/402, 493–494, 332, 349, 400; 709/323,
709/203; 348/174–175, 239, 423.1; 725/62,
725/86, 87, 101, 91–93, 103
See application file for complete search history.

(56) References Cited

U.S. PATENT DOCUMENTS

| | | | | |
|---|---|---|---|---|
| 5,982,298 A | * | 11/1999 | Lappenbusch et al. ...... | 340/905 |
| 6,233,428 B1 | * | 5/2001 | Fryer ......................... | 434/308 |
| 6,487,602 B1 | * | 11/2002 | Thakker ..................... | 709/230 |

FOREIGN PATENT DOCUMENTS

| | | |
|---|---|---|
| CN | 1172568 A | 2/1998 |
| EP | 0 797 342 A | 9/1997 |
| JP | 10-320685 A | 12/1998 |
| WO | WO 99 52304 A | 10/1999 |

OTHER PUBLICATIONS

Chinese Patent Office First Action dated Jun. 20, 2003 issued in Appln. No. 01119074.4.
"Supporting Adaptive Video Applications Mobile Environments", N. Davies et al., IEEE Communications Magazine, vol. 36, No. 6, Jun. 1, 1998.
"Wireless Video Surveillance: System Concepts", Proceedings 10th International Coference on Image Analysis and Processing, Proceedings of ICIAP '99—10th Int'l. Conference on Image Analysis and Processing, Venice, Italy, Sep. 17-29, 1999, pp. 1090-1095.
"Internet Based Remote Camera Control System", Edmond Chin-Ping Chang, Proceedings of the 1996 IEEE Intelligent Vehicles Symposium (Cat. No. 96TH8230), Proceedings of Conference on Intelligent Vehicles, Tokyo, Japan, Sep. 1996, pp. 126-129.
"Web Based Remote Security System (WRSS) Model Deveopment", Proceedings of the IEEE Southeastcon 2000 'Preparing for the New Millennium' (Cat. No. OOCH37105), Proceedings IEEE Southeastcon 2000. 'Preparing for the New Millennium', Nashville TN, Apr. 4-8, 2000, pp. 379-382.

* cited by examiner

*Primary Examiner*—Brenda Pham
(74) *Attorney, Agent, or Firm*—Dilworth & Barrese LLP

(57) ABSTRACT

A system and method for providing multimedia service using a mobile communication terminal comprising the steps of accessing a web server of an IP address in response to a request for multimedia information from a user via an Internet, receiving the requested multimedia information from the web server and displaying the multimedia information on a display as a moving image.

10 Claims, 9 Drawing Sheets

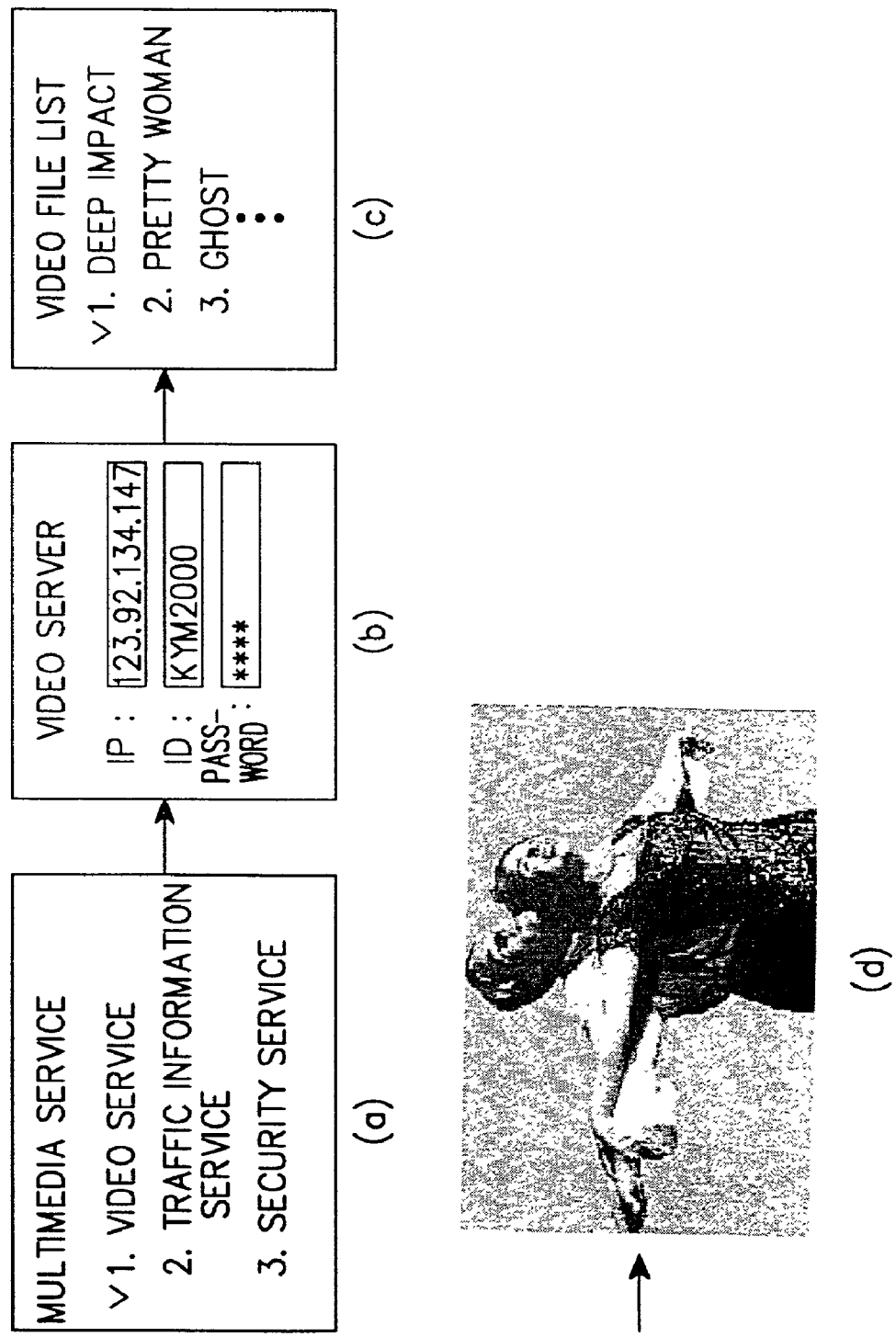

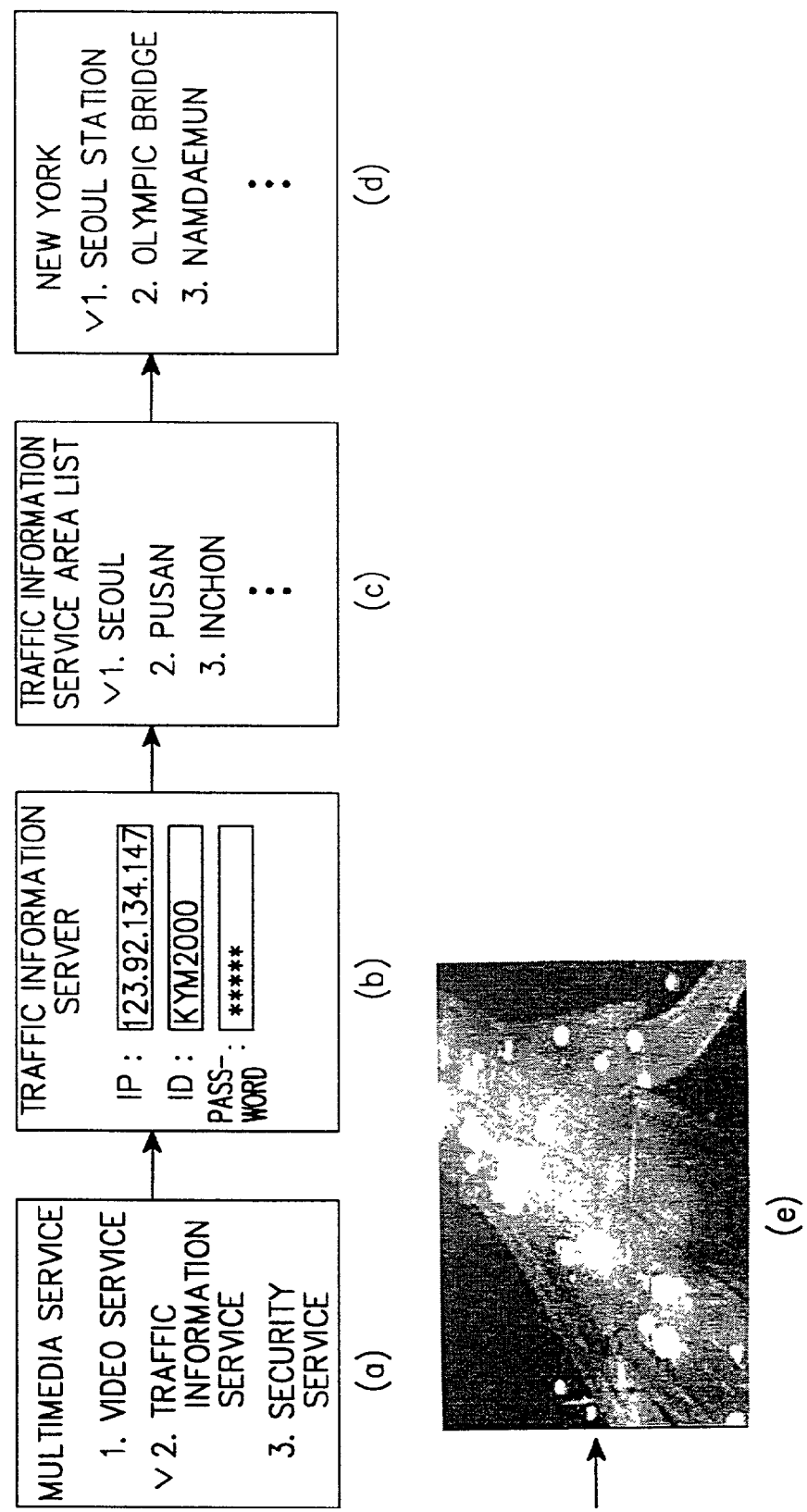

SYSTEM AND METHOD FOR PROVIDING MULTIMEDIA SERVICE USING A MOBILE COMMUNICATION TERMINAL

PRIORITY

This application claims priority to an application entitled "System and Method for Providing Multimedia Service Using a Mobile Communication Terminal" filed in the Korean Industrial Property Office on Jun. 3, 2000 and assigned Serial No. 2000-30612, the contents of which are hereby incorporated by reference.

BACKGROUND OF THE INVENTION

1. Field of the Invention

The present invention relates generally to a mobile communication terminal, and in particular to a system and method for providing multimedia service by using a mobile communication terminal.

2. Description of the Related Art

Generally, multimedia information includes voice and image data. Recently, a home or in-house computer and a television with a set-top box, connected to multimedia servers via wire networks, support various multimedia services such as movie service, traffic information service and Internet search service.

With the improvement in data processing capability of the mobile communication terminal, many attempts have been made to apply such multimedia service to the mobile communication terminal. For example, a wireless data service using the mobile communication terminal provides all kinds of service, such as Internet search service through PC communication, Internet access service, and facsimile transmission/reception service as well as conventional file transfer service via a wireless communication network provided by the existing PSTN (Public Switched Telephone Network) and PSDN (Public Switched Data Network).

With the help of the wireless data service, a user can make and manage a mobile office performing office work without regard to time and place. In addition, attempts to apply multimedia service such as VOD (Video-On-Demand) service, traffic information service, and security service have been provided to the mobile communication terminal in the conventional wire network.

SUMMARY OF THE INVENTION

An object of the present invention is to provide a system and method for providing multimedia service using a mobile communication terminal.

To accomplish the above and other objects, the system and method in accordance with the present invention comprises the steps of accessing a web server of an IP address in response to a request for multimedia information from a user via the Internet, receiving the requested multimedia information from the web server, and displaying the multimedia information on a display as a moving image.

BRIEF DESCRIPTION OF THE DRAWINGS

The above and other objects, features and advantages of the present invention will become more apparent from the following detailed description when taken in conjunction with the accompanying drawings in which:

FIG. 5 illustrates an example of images on the display of the mobile communication terminal during VOD service according to an embodiment of the present invention;

FIG. 6 illustrates an example of an image on the display during the traffic information service according to an embodiment of the present invention.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
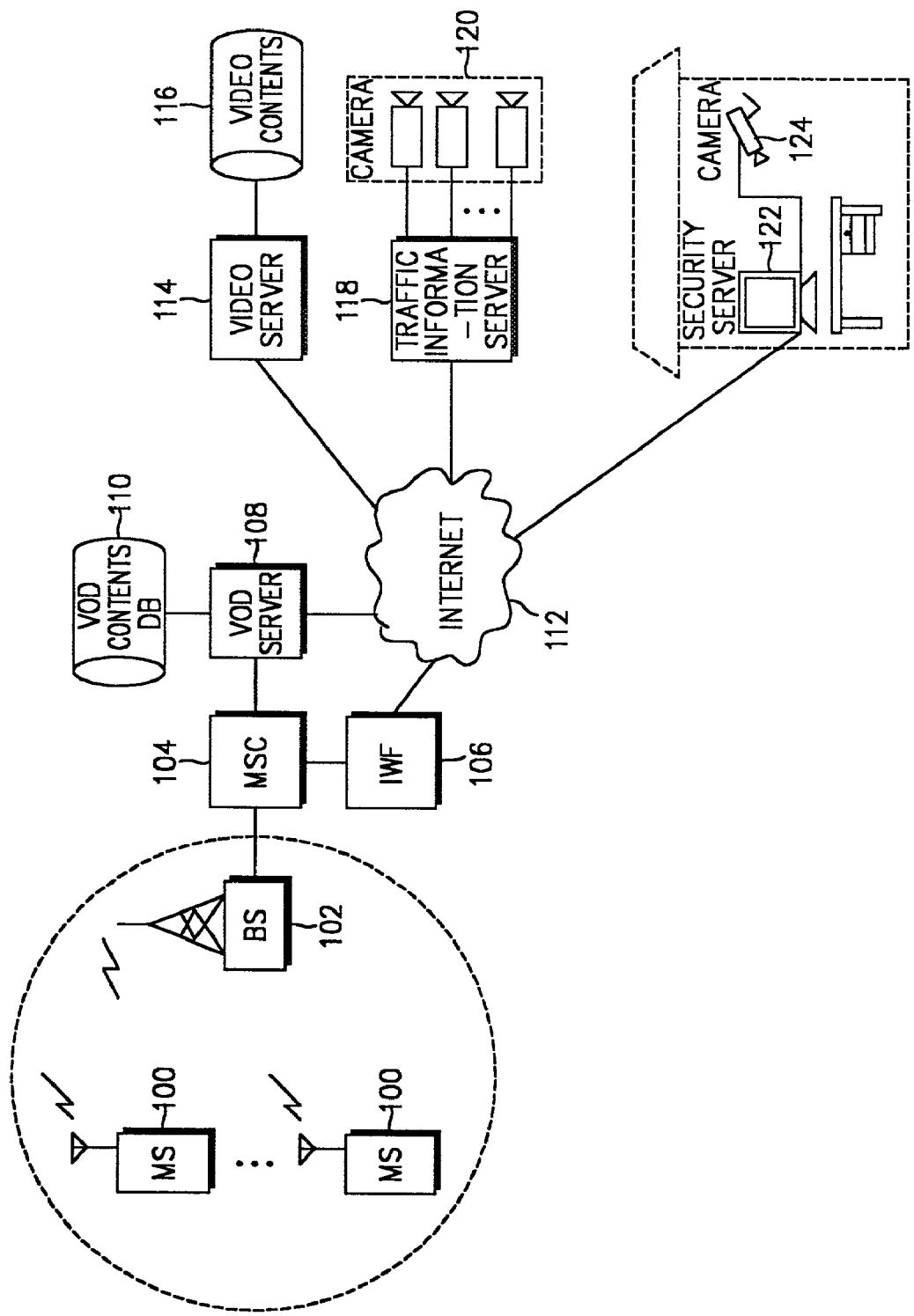
FIG. 1 illustrates a block diagram of a mobile communication system for multimedia service according to an embodiment of the present invention.

With reference to FIG. 1, a block diagram of a mobile communication system for multimedia service according to an embodiment of the present invention is shown, where a mobile station (MS) 100 receives multimedia information such as audio/video data and outputs the received multimedia information through a speaker (SPK) and a color LCD (Liquid Crystal Display) after demodulation. A mobile switching center (MSC) 104, in cooperation with IWF (Interworking Function) 106 connected to the MSC 104, accesses web servers 114, 118 and 122 connected to an IP (Internet Protocol) network, Internet 112, and transmits/receives radio data by supporting wireless data transmission/reception protocol. Further, the MSC 104 enables the MS 100 to transmit/receive the radio data to/from the web servers 114, 118 and 122 by connecting a request call for specific data service from the MS 100 and performing data repetition protocol for repeating the data from the MS 100. A Base Station (BS) 102 receives a radio signal for a call connection from the MS 100 located in its cell and informs the MSC 104 of the reception of the radio signal.

The video server 114, as an Internet service provider, contains video contents 116, in which various video data such as movies, TV dramas and documentaries is stored, and provides corresponding video data from the video contents 116 upon receipt of a request for the video data from the MS 100 via the IP network, Internet 112. The traffic information server 118 contains traffic condition image data which is inputted through cameras 120, each established on a plurality of roads, and provides the MS 100 with the traffic condition image data of a corresponding road in real-time upon receipt of a request for the traffic information of the road from the MS 100. The security server 122, preferably a PC, collects security condition image data which is inputted through a camera 124 established in each area of a particular place such as a home and an office, and provides the security condition image data of a corresponding area in real-time upon receipt of a request for the security information of the area from the MS 100.

A VOD server 108, connected to the MSC 104, stores VOD contents for the video data and the traffic condition image data, which has been uploaded from the video server 114 and the traffic information server 118, in a VOD contents DB (database) 110. The VOD server 108 retrieves corresponding data from the VOD contents DB 110 requested by the user from the video data and the traffic condition image data, and provides the MS 100 with the data from the VOD contents DB 110.

Figure 2:
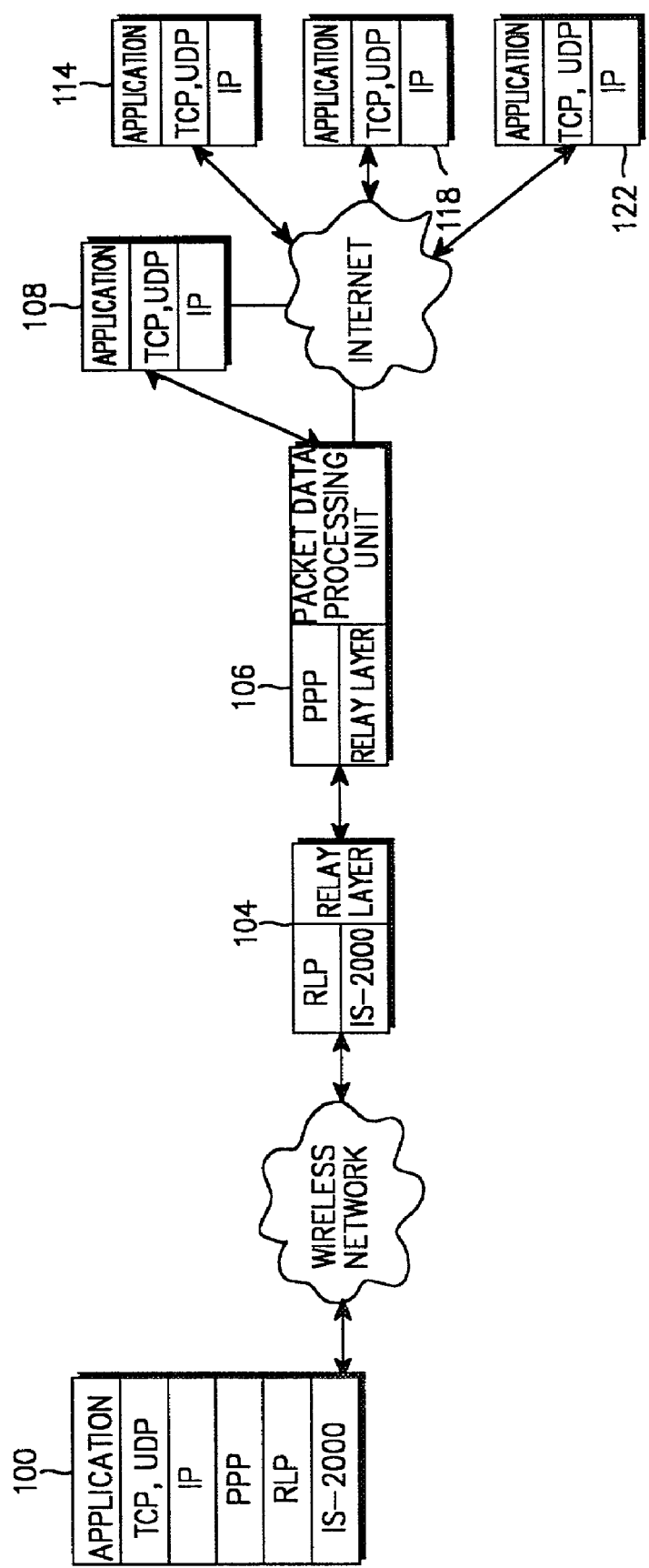
FIG. 2 illustrates protocol stacks of elements of the multimedia service system shown in FIG. 1.

FIG. 2 illustrates protocol stacks of elements of the multimedia system shown in FIG. 1. In the MS 100, a request from the user is transmitted to lower layers through an upper application layer that is for a user-interface. Further, TCP (Transmission Control Protocol), UDP (User Datagram Protocol)/IP protocols are used for Internet wireless communication, PPP (Point-to-Point Protocol) and RLP (Radio Link Protocol) are used for Internet access using a point-to-point method, and IS-2000 protocol is used in a physical layer.

The MSC 104 adapts the RLP protocol for transmitting packet data by wireless and the IS-2000 protocol in the physical layer for interfacing wireless data with the MS 100. Further, the MSC 104 has a relay layer for connection with the IWF 106. The IWF 106 transmits/receives data to/from the web servers 114, 118 and 122 via the Internet with a relay layer for cooperation with the MSC 104 and has the PPP stack for Internet access using a point-to-point method. Further, the MSC 104 has a packet data processing unit for processing packet data transmitted/received via the Internet. Each of the web servers 114, 118, 122 has TCP, UDP/IP protocol stack for Internet communication. The web servers 114, 118, 122 convert data transmitted through the upper application layer to packet data for TCP, UDP/IP protocol Internet communication and transmits the packet data to each server. The VOD server 108, like the web servers 114, 118 and 122 comprises an upper application layer and TCP, UDP/IP protocol stacks for Internet communication.

Figure 3:
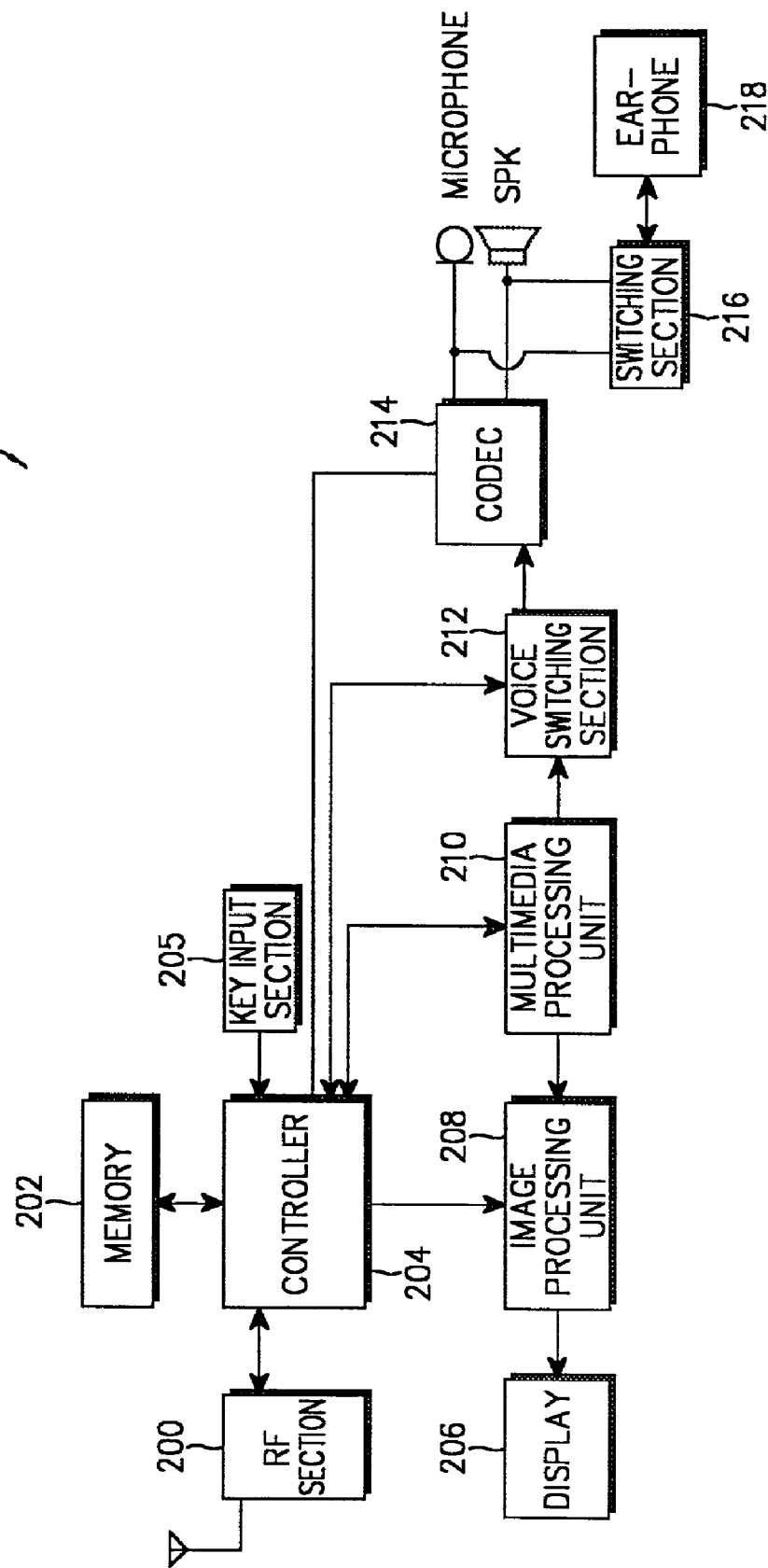
FIG. 3 illustrates a block diagram of a mobile communication terminal to which the present invention is applicable.

FIG. 3 illustrates a block diagram of a mobile communication terminal to which the present application is applicable. A more detailed operation of each element of the mobile communication terminal is described in Korean Application No. P2000-22107 filed by and assigned to the same assignee of this application.

With reference to FIG. 3, the controller 204 controls the whole operation of the mobile communication terminal such as phone conversation and other general functions (telephone numbers management, schedule management, voice dialing and bell mode selection). A memory 202 stores a variety of programs for performing the operation of the mobile communication terminal such as the telephone number data, the schedule data, and so on. An RF (Radio Frequency) section 200 transmits/receives radio signals and performs up/down-conversion, filtering and amplification on the received and transmitted radio signals. A key input section 205 comprises number keys and a plurality of function keys. Further, a mouse, a touch screen, etc. can be used additionally for the multimedia service according to an embodiment of the present invention. A display 206 comprises TFT (Thin Film Transistor) color LCD (Liquid Crystal Display) and displays character information, menu information, still image, moving image and so on. A CODEC (Coder/Decoder) 214 decodes received voice from the microphone and outputs it, or encodes voice data inputted through the microphone and outputs it. Generally, the CODEC 214 comprises a DSP (Digital Signal Process) chip. A switching section 216 switches the voice outputted from the CODEC 214 and the voice inputted by the user, to form a path to the CODEC 214 or an earphone 218 and a speaker or a microphone of the mobile communication terminal, respectively. The image processing unit 208 buffers the character information, the menu information, the still image and the moving image received from the controller 204 and multimedia processing unit 210, D/A converts them, and then transmits them to the display 206. The multimedia processing unit 210 connects to a corresponding server and requests data according to a request for a multimedia service by a user. When the voice and image data are received, the multimedia processing unit 210, after buffering, outputs the voice and image data in real-time. The image data is outputted through the image processing unit 208. The menu and character information is transmitted to the controller 204 to be outputted. The voice data is outputted through the CODEC 214. The voice switching section 212 switches general voice from the controller 204 and voice or real audio relating to the moving image from the multimedia processing unit 210 to the CODEC 214.

Figure 4A:
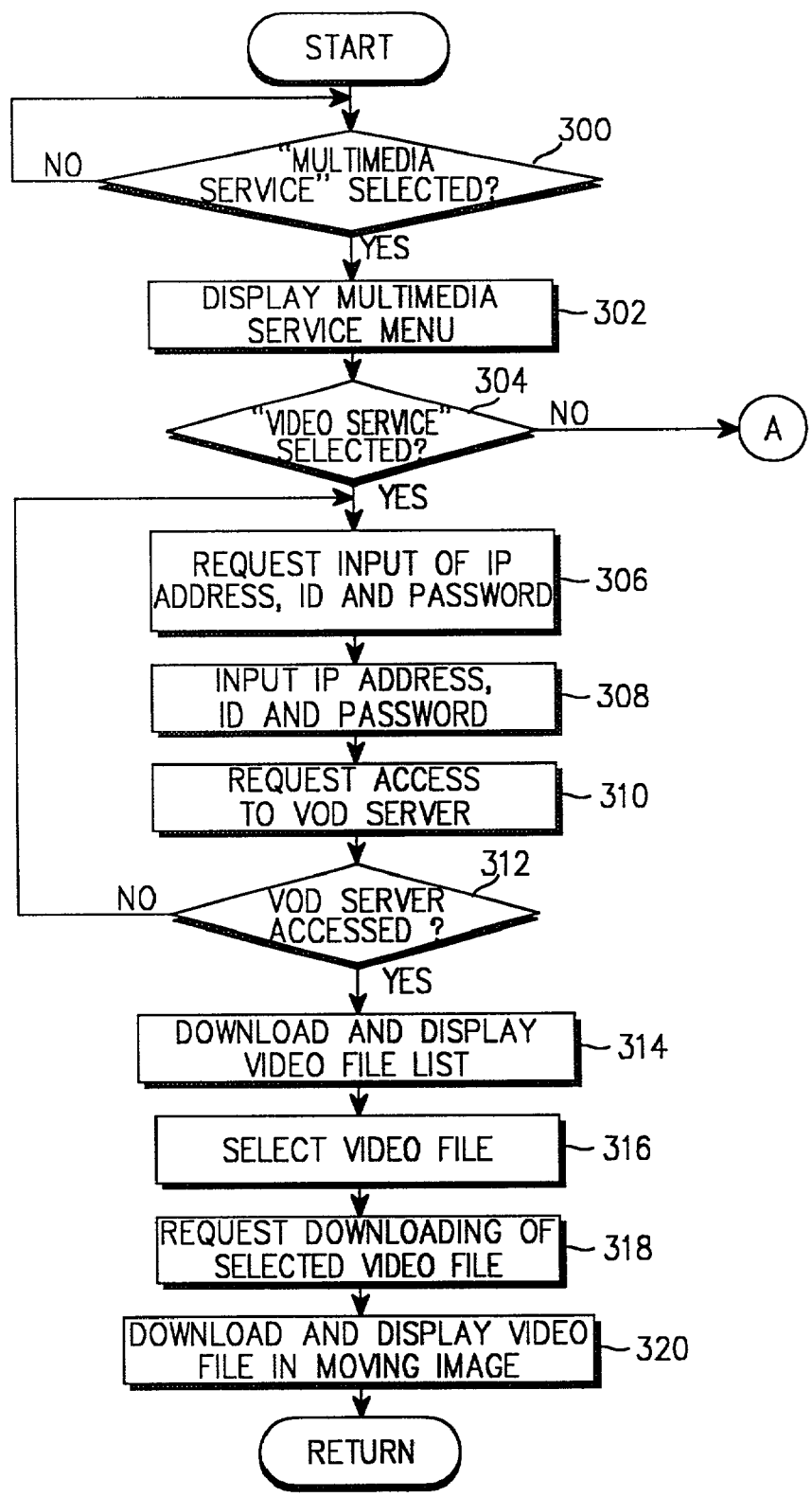
FIGS. 4A, 4B, and 4C are flow charts illustrating a procedure for performing multimedia services according to an embodiment of the present invention.
Figure 4B:
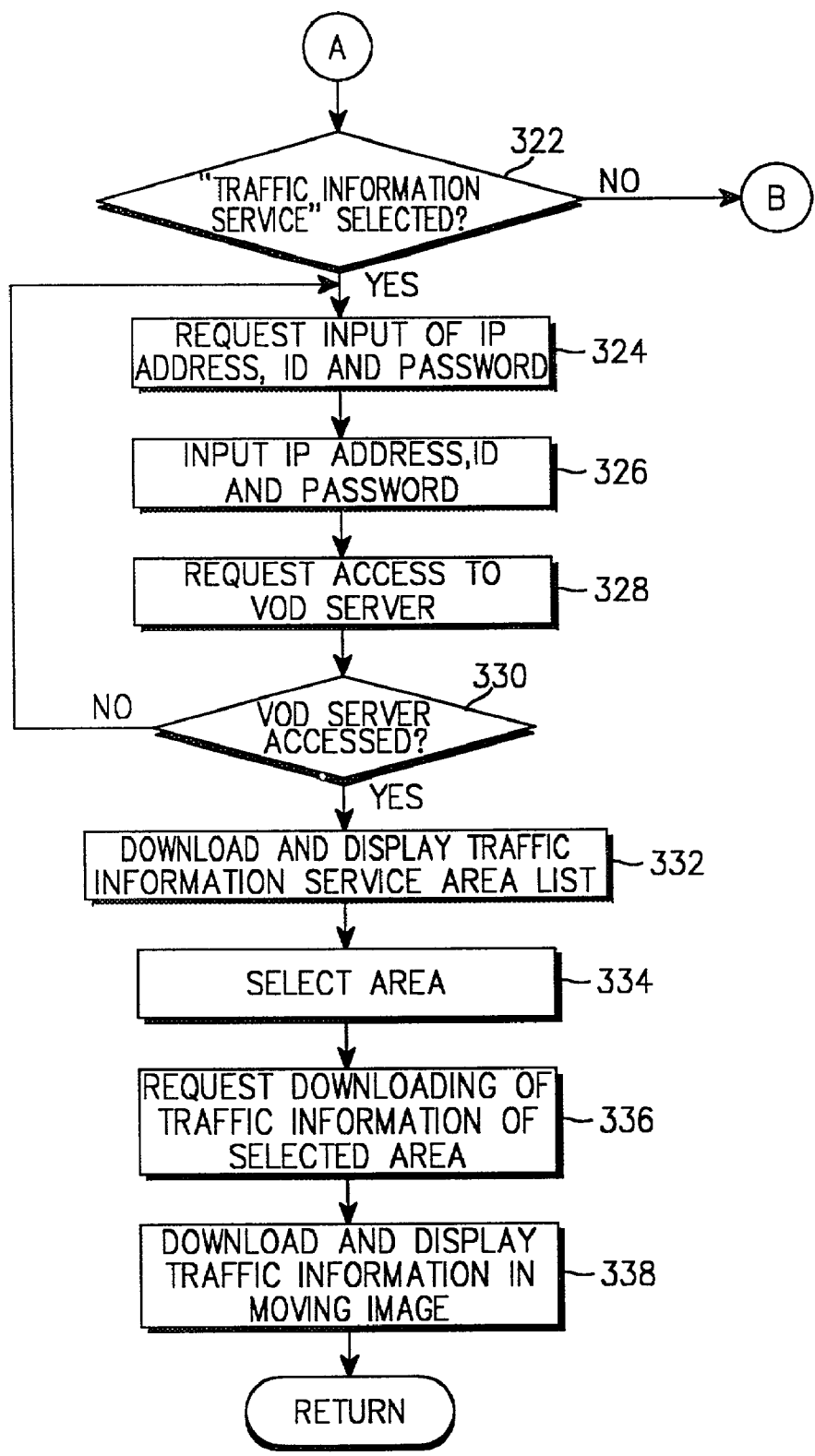
Figure 4C:
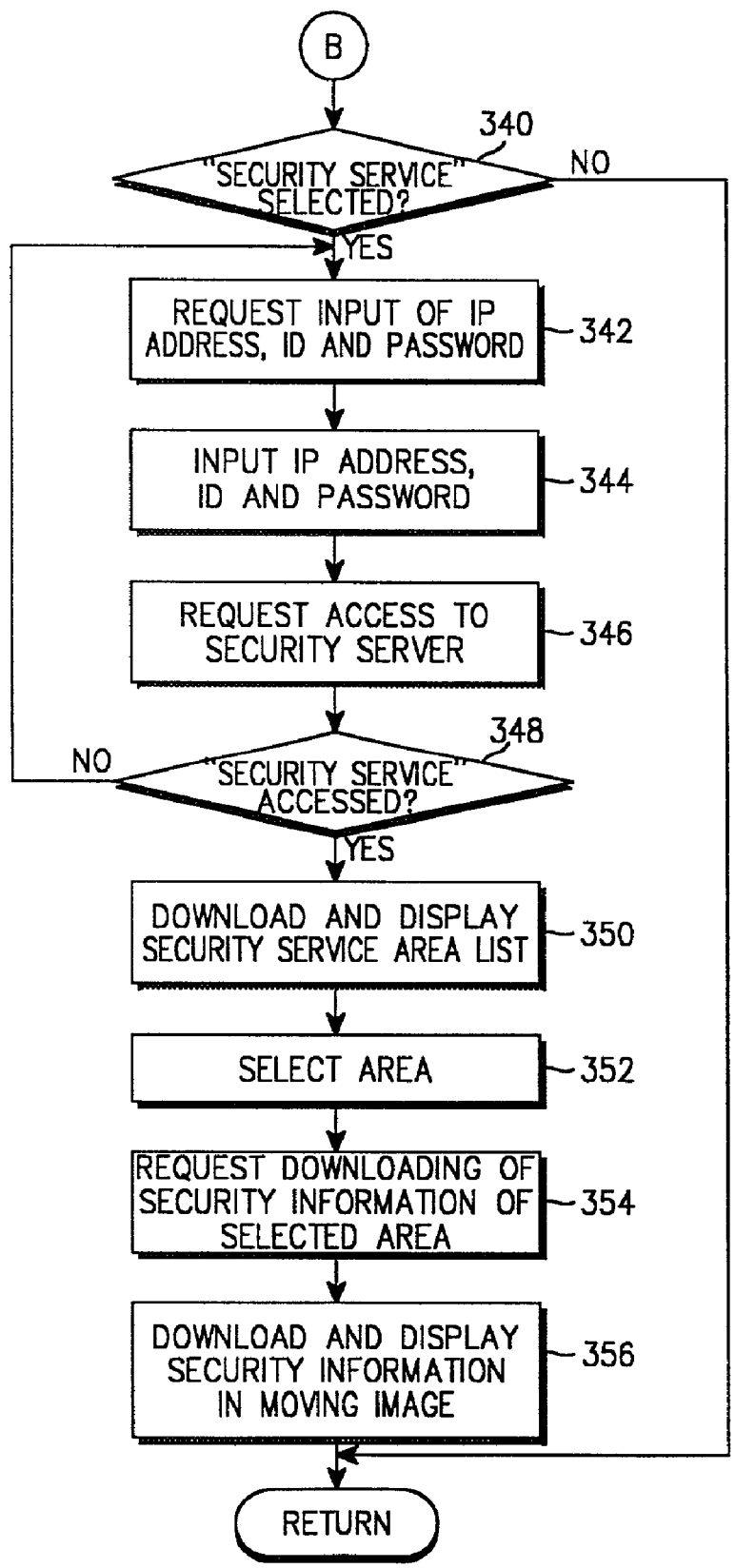

FIGS. 4A, 4B, and 4C are flow charts illustrating a procedure for performing the multimedia service according to an embodiment of the present invention. The figures correspond to video (VOD) service, traffic information service and security service, respectively.

Figure 7:
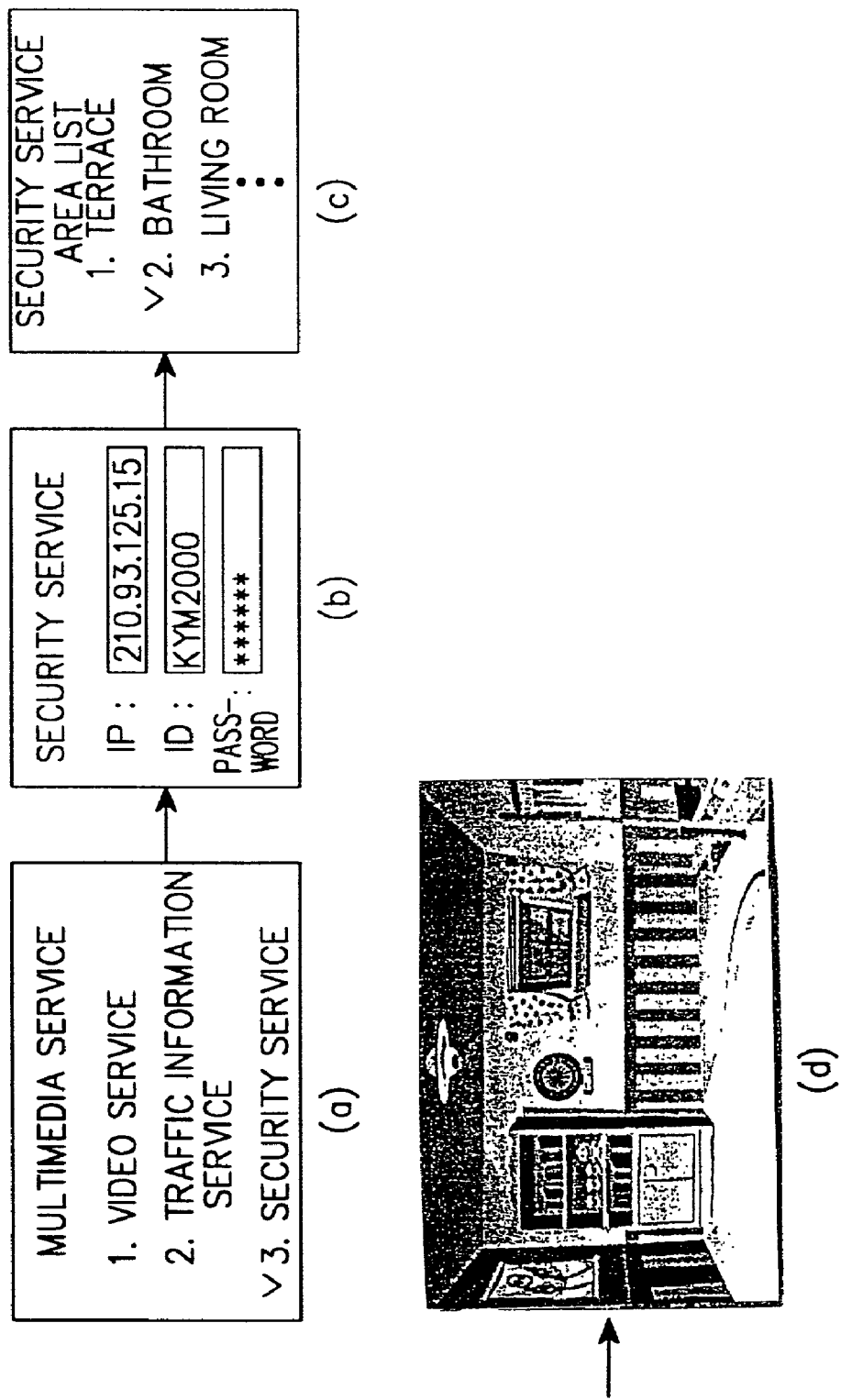
FIG. 7 illustrates an example of an image on the display during the security service according to an embodiment of the present invention.

FIG. 5 illustrates an example of images on the display of the mobile communication terminal during the VOD service according to an embodiment of the present invention. FIG. 6 illustrates an example of images on the display of the mobile communication terminal during the traffic information service according to an embodiment of the present invention. FIG. 7 illustrates an example of images on the display of the mobile communication terminal during the security service according to an embodiment of the present invention.

Embodiments of the present invention will be described in detail with reference to the FIGS. 4A to 7.

First, the operation control flow for the video service from the multimedia service according to an embodiment of the present invention will be described hereinafter with reference to FIG. 4A. When a user intends to use multimedia service with the mobile communication terminal, he can enter a menu mode including the multimedia service, and select "multimedia service" which is added into the menu according to an embodiment of the present invention.

As stated above, the multimedia service comprises receiving various voice and image information in real-time and displaying it on the display 206 in a moving image. In step 300, the controller 204 checks whether "multimedia service" is selected from the menu. If so, in step 302, the multimedia service menu for the multimedia service is displayed as shown in FIG. 5a. The video service in the multimedia service menu comprises downloading various video data such as movies, TV dramas, documentaries and so on from the video server 114 connected to the Internet 112 and providing them to the mobile communication terminal for the user's seeing and hearing. The traffic information service comprises receiving the traffic condition image data from a number of cameras 120 established on roads, which are connected to a traffic control center via the Internet 112, and providing the user with the current traffic condition image data of each road. Further, the security service comprises receiving the security condition image data of areas via the Internet 112, which is inputted through the camera 124 connected to the PC 122 in an office or in the home, and providing the user at a remote distance with the security condition image data of each area.

In step 302, the user can select a desired service from the multimedia service menu displayed on the display 206. If the user selects the "video service" among the multimedia service menu, the controller 204 proceeds from step 304 to step 306, and requests the user to input an IP (Internet Protocol) address of the VOD server 108 and the user's ID (identification) and password for connection to the VOD server 108 connected to the MSC 104 as shown in FIG. 5b. In response to this request, the user inputs the IP address of the VOD server 108 and the user's ID and password for connection to the VOD server 108, and the controller 204 proceeds to step 310 to request a connection to the VOD server 108 connected to the MSC 104. The MSC 104 transmits the user's ID and password to the VOD server 108. The VOD server 108 receives the request for connection from the MSC 104 and identifies the received ID and password. If the received ID and password proves to be an authorized ID and password, that is to say, if the received ID and password are identical to those registered in the VOD server 108, the VOD server 108 allows the mobile terminal to access it. The controller 204 proceeds from step 312 to step 314 and downloads a video list from the VOD server 108 and displays it on the display 206.

FIG. 5c shows an example of the video list from the VOD server 108 displayed on the display 206. The VOD server 108 transmits the video list shown in FIG. 5c, and allows the user to select his desired video.

Accordingly, the user sees the video list displayed as shown in FIG. 5c and the video he desires. The controller 204 recognizes the video selection input from the user in step 316, and proceeds to step 318 to request the VOD server 108 to download the video data selected by the user. According to this request, the VOD server 108 retrieves the requested video data from the VOD contents DB 110, and transmits it to the corresponding mobile communication terminal via the MSC 104. In step 320, the controller 204 displays the video data transmitted from the VOD server 108 in a moving image as shown in FIG. 5d or stores the transmitted video data and displays it in a moving image upon requested by the user later on.

Next, the operation control flow for the traffic information service from the multimedia service according to an embodiment of the present invention will be described with reference to FIG. 4B.

If the user selects the "traffic information service" from the multimedia information service menu displayed on the display 206 in step 302, as shown in FIG. 6a, the controller 204 proceeds from step 322 to step 324 and requests the user to input an IP address of the VOD server 108 and the user's ID and password for connection to the VOD server 108 which is connected to the MSC 104 as shown in FIG. 6b. Then, the user inputs the IP address of the VOD server 108 and the user's ID and password for connection to the VOD server 108 via the MSC 104 in step 326, and the controller 204 proceeds to step 310 to request a connection to the VOD server 108 connected to the MSC 104.

In response to this request, the MSC 104 transmits the user's ID and password to the VOD server 108. The VOD server 108 receives the request for connection from the MSC 104 and identifies the received ID and password. If the received ID and password proves to be an authorized ID and password, that is to say, if the received ID and password are identical to those registered in the VOD server 108, the VOD server 108 allows the mobile communication terminal to connect to it Then, as a result of the connection to the VOD server 108, the controller 204 proceeds from step 330 to step 332 and downloads traffic information service road list from the VOD server 108 and displays it on the display 206.

FIG. 6c shows an example of the traffic information service road list from the VOD server 108 displayed on the display 206. The VOD server 108 transmits the traffic information service road list, for which cameras 120 are established, as shown in FIG. 6c, and allows the user to select the road for which the user desires to have the traffic information.

Accordingly, the user sees the traffic information service road list for which the traffic information can be provided, displayed as shown in FIGS. 6c and 6d and selects the road he desires in a regular sequence. The controller 204 recognizes the road selection input from the user in step 334, and proceeds to step 336 to request the VOD server 108 to download the traffic condition image data of the road selected by the user. The VOD server 108 retrieves the requested traffic condition data from the VOD contents DB 110, and transmits it to the mobile communication terminal via the MSC 104. Then, in step 338, the controller 204 displays the traffic condition data transmitted from the VOD server 108 in a moving image as shown in FIG. 6a, or stores the traffic condition image data and displays it in a moving image upon request by the user later on.

Lastly, the operation control flow for the security service among the multimedia service according to an embodiment of the present invention will be described with reference to FIG. 4C.

If the user selects the "security service" from the multimedia service menu displayed on the display 206 in step 302 as shown in FIG. 7a, the controller 204 proceeds from step 340 to step 342 and requests the user to input an IP address of the security server, the PC 122 in an office or in the home, and the user's ID and password for connection to the PC 122 which is connected to the MSC 114 via the Internet 112 as shown in FIG. 7b. The user inputs the IP address of the PC 122 connected to the MSC 104 via the Internet 112 in step 344, and the controller 204 proceeds from step 344 to step 345 to request a connection to the PC 122 connected to the MSC 104. In response to this request, the MSC 104 transmits the user's ID and password to the PC 122. The PC 112 receives the request from the MSC 104 and identifies the received ID and password. If the received ID and password prove to be an authorized user's ID and password, that is to say, if the received ID and password are identical to those registered in the VOD server 108, the PC 122 allows the mobile communication terminal to connect to it. Then, as a result of the connection to the PC 122, the controller 204 proceeds from step 348 to step 350 and downloads security service area list from the PC 122 and displays it on the display 206.

FIG. 7c illustrates an example of the security service area list from the PC 122 displayed on the display 206. The PC 122 downloads the security service area list of the office or the home where cameras 124 are established and allows the user to select the area for which the user desires to have the security information. The user sees the security service area list for which the security information can be provided, displayed as shown in FIG. 7c, and selects the area he desires in a regular sequence. Then, the PC 122 recognizes the area selection input from the user in step 352, and proceeds to step 354 to request the PC 122 to download the security condition image data of the area selected by the user.

According to this request, the PC 122 transmits the security condition image data inputted through the camera 124 of the selected area to the mobile communication terminal via the MSC 104 in real-time. Then, in step 356, the controller 204 downloads and displays the security condition image data in real-time on the display 206 in a moving image as shown in FIG. 7d, or downloads and displays the security condition image data of the area upon request by the user later on.

As a result, even when moving, the user can see multimedia information such as video, traffic information, security information in a moving image by using a the mobile communication terminal. As described above, by virtue of the present invention, it is possible to enjoy multimedia service such as TV broadcasting service, VOD service, traffic information service and security service by using a mobile communication terminal.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A method for providing multimedia service, comprising the steps of:
   accessing a web server of an TP address via an Internet, in response to a request for multimedia information by a user of a mobile communication terminal by requesting the user to input a user ID for connection to the web server and allowing the user to access the web server if the input ID is identical to a user ID registered in the web server;
   retrieving the multimedia information requested by the user from the web server; and
   displaying the multimedia information received, in response to the request, from the web server by wireless on a display as a moving image,
   wherein video data, transmitted from a video server via the Internet, is stored in a Video-On-Demand (VOD) contents database of a VOD server of a mobile switching center, and then wirelessly transmitted to the mobile communication terminal.

2. The method according to claim 1, wherein the step of accessing the web server further comprises the steps of:
   requesting the user to input the user ID and a password for connection to the web server; and
   allowing the user to access the web server if the input user ID and the input password are identical to those registered in the web server.

3. The method according to claim 1, wherein the multimedia information comprises traffic condition image data showing traffic conditions of one of a plurality of roads.

4. The method according to claim 1, wherein the multimedia information comprises security condition image data showing security conditions of one of a plurality of areas.

5. The method according to claim 3, wherein the traffic condition image data, transmitted from a traffic information server via the Internet, is stored in a Video-On-Demand (VOD) contents database of a VOD server of the mobile switching center, and then transmitted to the mobile communication terminal by wireless.

6. The method according to claim 4, wherein the security condition image data is transmitted in real time from a security server to the mobile communication terminal via the mobile switching center.

7. A method for providing multimedia service, comprising the steps of:
   displaying a multimedia service menu on a display in response to a request for multimedia information from a user of a mobile communication terminal via an Internet;
   accessing a Video-On-Demand (VOD) server by inputting an IP address of the VOD server connected to a mobile switching center and the user's ID and password, if "video service" is selected from the multimedia service menu;
   downloading a video list from the VOD server and displays the video list on the display;
   requesting video data selected by the user from the video list; and
   receiving the video data from the VOD server in response to the request, and displaying the video data on the display as a moving image.

8. A method for providing multimedia service, comprising the steps of:
   displaying a multimedia service menu on a display in response to a request for multimedia information from a user of a mobile communication terminal via an Internet;
   accessing a Video-On-Demand (VOD) server by inputting an IP address of the VOD server connected to a mobile switching center and the user's ID and password, if "traffic information service" is selected from the multimedia service menu;
   downloading a traffic information service road list from the VOD server and displaying the traffic information service road list on the display;
   requesting traffic condition image data of a road selected by the user from the traffic information service road list from the VOD server; and
   receiving the traffic condition image data from the VOD server in response to the request, and displaying the traffic condition image data on the display as a moving image.

9. A method for providing multimedia service, comprising the steps of:
   displaying a multimedia service menu on a display in response to a request for multimedia information from a user of a mobile communication terminal via an Internet;
   accessing a security server, by inputting an IP address of the security server connected to a mobile switching center and the user's ID and password if "security service" is selected from the multimedia service menu;
   downloading a security service area list from the security server and displaying the security service area list on the display;
   requesting security condition image data of an area selected by the user from the security service area list from the security server; and
   receiving the security condition image data of the area from the security server via the mobile switching center in real time in response to the request and displaying the security condition image data on the display as a moving image.

10. The method according to claim 9, wherein the security server is a PC.

* * * * *